(12) United States Patent
Shoji (10) Patent No.: US 6,900,452 B2
(45) Date of Patent: May 31, 2005

(54) IMAGE INFORMATION RECORDING/READING METHOD AND APPARATUS

(75) Inventor: Takashi Shoji, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 79 days.

(21) Appl. No.: 10/662,575

(22) Filed: Sep. 16, 2003

(65) Prior Publication Data

US 2004/0051063 A1 Mar. 18, 2004

(30) Foreign Application Priority Data

Sep. 17, 2002 (JP) ........................................ 2002-270060

(51) Int. Cl.[7] ................................................ G01T 1/00
(52) U.S. Cl. ..................................................... 250/580
(58) Field of Search ................................. 250/580, 591

(56) References Cited

U.S. PATENT DOCUMENTS 4,535,468 A  8/1985  Kempter
6,044,128 A  3/2000  Tanaka et al.
6,268,614 B1  7/2001  Imai
6,627,895 B2 *  9/2003  Arakawa ............... 250/370.09

FOREIGN PATENT DOCUMENTS

JP  2000-284056 A  10/2000
JP  2001-119626 A  4/2001

* cited by examiner

Primary Examiner—David Porta
Assistant Examiner—Marcus Taningco
(74) Attorney, Agent, or Firm—Sughrue Mion, PLLC (57) ABSTRACT

An image information recording/reading method and apparatus for positive and short-circuited reading system capable of obtaining both moving and still pictures with improved image quality. The method and apparatus are designed to obtain favorable images in the imaging of both still and moving pictures by applying a necessary and sufficient voltage to avoid the influence of fixed noise at the time of still picture imaging, and applying a higher voltage than that of the still picture imaging at the time of moving picture imaging, in which the intensity of the radiation (recording light) is limited because of the continuous irradiation of the radiation (recording light).

16 Claims, 6 Drawing Sheets

IMAGE INFORMATION RECORDING/READING METHOD AND APPARATUS

BACKGROUND OF THE INVENTION

1. Field of the Invention

The present invention relates to an image information recording/reading method and apparatus for storing recording light carrying image information as an electrostatic latent image on an image detector that converts the recording light into electric charges that represent a latent image for storage, and reading out the electrostatic latent image stored in the image detector.

2. Description of the Related Art

Conventionally, systems that use an image detector, such as a facsimile machine, copying machine, and radiation image obtaining system have been known.

For example, in medical X-ray and other radiography, a system that uses an image detector having an X-ray sensitive photoconductor made of, for example, a-Se (amorphous selenium) plate to reduce the radiation dosage received by a subject, and to improve the diagnostic capability has been known. The system irradiates recording light, such as X-rays carrying image information on the image detector to store electric charges that represent a latent image of the image information into a storage section of the detector, and thereafter reads out the electrostatic latent image carried by the charges representing the latent image, i.e., the image information stored in the image detector by scanning the image detector with a reading electromagnetic wave, such as a laser beam (hereinafter referred to as "reading light"), and detecting the electric current generated in the image detector by the scanning through flat or comb electrodes on both sides of the detector.

The process for recording image information on the image detector, and reading out the recorded image information from the image detector differs from system to system, depending on the layer structure of the image detector used. For example, when an image detector having electrodes on both sides, with a recording and reading photoconductive layers disposed therebetween is used, the recording light is irradiated on the recording photoconductive layer to form an electrostatic latent image in the storage section of the image detector with a recording voltage being applied between the electrodes, and thereafter the electrodes are short-circuited to be maintained at the same potential, then the reading photoconductive layer is scanned with reading light through the electrode having transparency to the reading light (hereinafter referred to as "reading side electrode"), and the electric current generated by the photoinduced discharges of electron/hole pairs (charge pairs) produced at the interface between the reading side electrode and reading photoconductive layer is converted into a voltage signal to electrically read out the electrostatic latent image. In this case, the section of the detector that has received no recording light generates no electric current, and the section that has received higher intensity reading light produces a larger amount of electric current at the time of reading the electrostatic latent image. The system that reads out the electrostatic latent image with the electrodes being short-circuited after recording as in the system described above is referred to as the short-circuited reading system, and the system in which a larger amount of electric current is generated at the brighter section of the image is referred to as the positive system.

One example of a specific layer structure of the image detector used for the short-circuited reading and positive system comprises a first electroconductive layer (hereinafter referred to as the "recording side electrode layer"); a recording photoconductive layer; a trap layer as the storage section; a reading photoconductive layer; and a second electroconductive layer (hereinafter referred to as the "reading side electrode layer") as described, for example, in U.S. Pat. No. 4,535,468.

Also, there has been proposed an image detector, as one of the positive type image detectors, comprising a first electroconductive layer having transparency to recording radiation; a recording photoconductive layer that takes on photoconductivity when irradiated with the recording radiation; a charge transport layer that serves substantially as an insulator against the charges having the same polarity as that of the charges charged on the first electroconductive layer, and serves substantially as an electrical conductor for the charges having the reverse polarity; a reading photoconductive layer that takes on photoconductivity when irradiated with reading light; and a second electroconductive layer having transparency to reading light, layered in this order, and having a storage section at the interface between the recording photoconductive layer and charge transport layer as described, for example, in U.S. Pat. No. 6,268,614 and Japanese Unexamined Patent Publication No. 2000-284056.

Here, in the short-circuited reading system, a discharge current continues to flow for about one second just after the electrodes on both sides are short-circuited. If an electrostatic latent image is read out during this time period, the quality of the image is degraded, because the discharge current is added to the signal current. Accordingly, it is necessary to read out the image after about one second or more has elapsed from the time when the electrodes are short-circuited in order to obtain a high quality image, and it is difficult to use the conventional short-circuited reading system for obtaining a moving-picture-like image, in which a plurality of image frames needs to be obtained within one second, so that its use is limited to still picture imaging.

In the mean time, there is a demand for a system that allows the user to set the optimum conditions for still picture imaging, including positioning, confirmation of an imaging timing and sensitivity requirements by moving picture imaging prior to the still picture imaging, and immediately thereafter obtain a still picture under the optimum conditions. In this case, it is preferable that the same image detector is to be used for both motion picture imaging and still picture imaging to eliminate a switching time loss.

The use of the conventional short-circuited reading system is limited to the still picture imaging as described above, so that it can not respond to such a demand.

For this reason, there has been proposed an image information recording/reading method and apparatus capable of imaging moving pictures for use with the positive and short-circuited reading system as described in Japanese Unexamined Patent Publication No. 2001-119626.

SUMMARY OF THE INVENTION

It is an object of the present invention to further improve the quality of the images obtained by the image information recording/reading method and apparatus described in Japanese Unexamined Patent Publication No. 2001-119626, and the like.

A first image information recording/reading method of the present invention is an image information recording/reading method for use with an image detector that converts recording light into electric charges that represent a latent image for storage, said method comprising the steps of:

(a) implementing moving picture imaging for obtaining a moving picture by
   (1) alternately repeating irradiation of recording light carrying image information on said image detector, and reading of the charges representing the latent image for sequentially obtaining electrical signals in proportion to the amount of said charges, with a moving picture recording voltage being applied to said image detector; and
(b) implementing still picture imaging for obtaining a still picture by
   (1) irradiating recording light carrying image information to store the charges that represent the latent image of said image information, with a still picture recording voltage being applied to said image detector, and
   (2) reading out said charges for obtaining an electrical signal in proportion to the amount of said charges,
wherein said moving picture recording voltage is set higher than said still picture recording voltage.

In the first image information recording/reading method described above, the term "alternately repeating irradiation of recording light carrying image information on said image detector, and reading of the charges representing the latent image" includes repeated reading of the charges representing the latent image for a plurality of frames, with the recording light being continuously irradiated on the image detector, as well as irradiating recording light as a pulse on the image detector, and reading out the charges representing the latent image during the time when the irradiation of the recording light is ceased in synchronization with the pulse of the recording light.

A second image information recording/reading method of the present invention is an image information recording/reading method for use with an image detector comprising:
   a first electrode layer;
   a recording photoconductive layer that takes on electroconductivity when irradiated with recording light;
   a reading photoconductive layer that takes on electroconductivity when irradiated with reading light; and
   a second electrode layer,
layered in this order, and having a storage section formed between said first and second electrode layers for storing electric charges produced in said recording photoconductive layer as charges representing a latent image, said method comprising the steps of:
   (a) implementing moving picture imaging for obtaining a moving picture by
      (1) alternately repeating irradiation of recording light carrying image information on said recording photoconductive layer, and scanning of said reading light for sequentially obtaining electrical signals in proportion to the amount of charges representing the latent images stored in said storage section, with a moving picture recording voltage being applied between the electrodes of said first and second electrode layers, and
   (b) implementing still picture imaging for obtaining a still picture by
      (1) performing a false reading, in which still picture pre-exposure light is irradiated on said reading photoconductive layer, with said electrodes of said first and second electrode layers being maintained at the same potential,
      (2) irradiating recording light carrying image information on said recording photoconductive layer, with a still picture recording voltage being applied between said electrodes of said first and second electrode layers to store the charges that represent the latent image of said image information in to said storage section after said false reading is completed, and
      (3) scanning said reading light for obtaining an electrical signal in proportion to the amount of said charges stored in said storage section, with said electrodes of said first and second electrode layers being maintained at the same potential,
wherein said moving picture recording voltage is set higher that said still picture recording voltage.

In the second image information recording/reading method described above, the term "alternately repeating irradiation of recording light carrying image information on said recording photoconductive layer, and scanning of said reading light" includes repeated scanning of said reading photoconductive layer with said reading light for a plurality of image frames, with said recording light being continuously irradiated on the recording photoconductive layer, as well as irradiating the recording light as a pulse on the recording photoconductive layer, and scanning the reading photoconductive layer with the reading light during the time when the irradiation of the recording light is ceased in synchronization with the pulse of the recording light.

In the first and second image information recording/reading methods described above, the "recording light" may be any light, or the like as long as it is capable of producing the charges that represent the latent image in the image detector when irradiated on the image detector. More specifically, it may be light, radiation, light generated by the excitation of radiation, etc.

The "reading light" may be any light, as long as it is capable of moving the charges within the image detector, and allows the electrostatic latent image to be electrically read out. More specifically, it maybe light, radiation, or the like.

Figure 3:
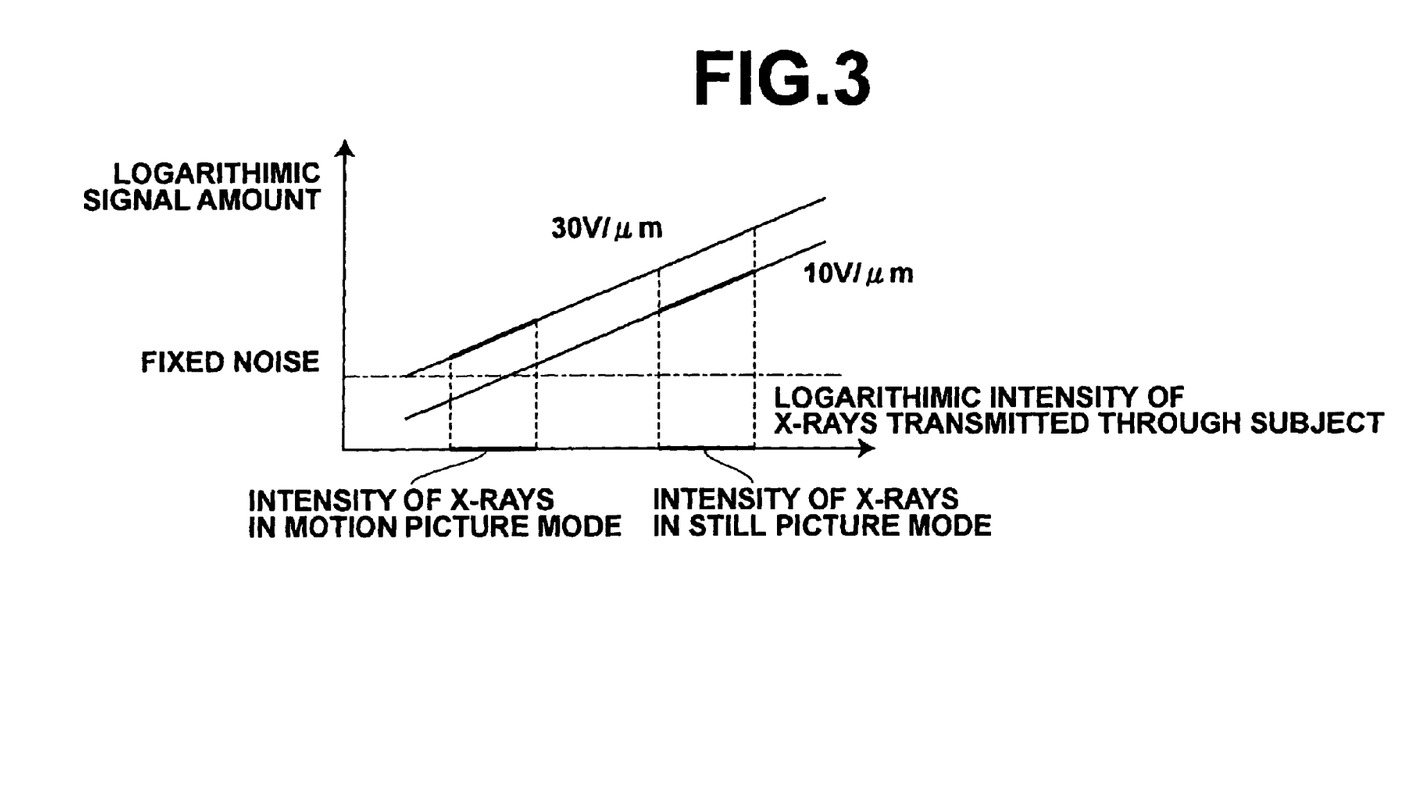
FIG. 3 is a graph illustrating the relationship between the intensity of recording light and an amount of signal obtained by imaging with respect to the field intensity (applied voltage) within an image detector at the time of recording.

In the first and second image information recording/reading methods, the relationship between the intensity of the recording light and the amount of signal obtained by imaging with respect to the field intensity (applied voltage) within the image detector at the time of recording is as shown in the graph in FIG. 3. As the graph indicates, the higher the intensity of the recording light, and the higher the voltage applied to the image detector, the larger the amount of signal obtained will be, so that an image with a higher signal-to-noise ratio may be obtained. When radiation is used as the recording light, however, the intensity of the recording light needs to be kept relatively low to avoid an excessive dosage of radiation to the human body. As for the voltage applied to the detector, it is more likely that the image is deformed by the charges injected into the image detector, and the like as the voltage applied is increased at the time when the detector is switched from the state in which the voltage is being applied to the state in which the detector is short-circuited, and vice versa.

In addition, the electrodes on both sides of the detector may be short-circuited to avoid the noise from the power supply at the time of reading the charges representing the latent image, but in the case of moving picture imaging, the electrodes may not be short-circuited due to time constraints, since the moving picture requires image forming at a rate of 10 to 30 frames/second.

Based on the facts described above, the image information recording/reading method of the present invention is designed to obtain favorable images in the imaging of both still and moving pictures by applying a necessary and sufficient voltage to avoid the influence of fixed noise at the time of still picture imaging, and applying a higher voltage than that for the still picture imaging at the time of recording a moving picture, in which the intensity of the radiation (recording light) is limited because of the continuous irradiation of the radiation (recording light), and the electrodes may not be short-circuited at the time of reading.

In the first and second image information recording/reading methods described above, it is preferable to correct the images using different pixel correction data between the still picture imaging and moving picture imaging, because the change in the voltage level applied to the image detector causes a variation in the dispersion of the pixels due to the change in the applied field intensity within the image detector.

In general, in the still picture imaging, a higher intensity recording light is irradiated than that for the moving picture imaging, so that an image lag is likely to be developed in the image detector. For this reason, it is preferable to correct the influence of image lag of the still picture for the moving picture based on the electrical signal obtained by the still picture imaging, when still picture imaging and moving picture imaging are alternately repeated. In this case, it is more preferable to reduce the amount of correction for the image lag in proportion to the duration of the moving picture imaging, since the image lag is gradually reduced with heat excitation.

A first image information recording/reading apparatus of the present invention is an image information recording/reading apparatus for implementing the first image information recording/reading method described above, and comprises:

(a) an image detector for converting recording light into electric charges that represent a latent image for storage;

(b) a voltage application means for applying a predetermined voltage to said image detector;

(c) a recording light irradiation means for irradiating recording light carrying image information on said detector;

(d) a signal obtaining means for obtaining an electrical signal in proportion to the amount of the electric charges representing the latent image from said detector; and (e) a control means for controlling said voltage application means, recording light irradiation means, and signal obtaining means in such a manner as to implement
  a) moving picture imaging, in which a moving picture is obtained by
    1) alternately repeating irradiation of recording light carrying image information on said image detector, and reading of the charges representing the latent image for sequentially obtaining electrical signals in proportion to the amount of said charges, with a moving picture recording voltage being applied to said image detector; and
  b) still picture imaging, in which a still picture is obtained by
    1) irradiating recording light carrying image information to store the charges that represent the latent image of said image information, with a still picture recording voltage being applied to said image detector, and
    2) reading out said charges for obtaining an electrical signal in proportion to the amount of said charges,
  wherein said control means controls said voltage application means to provide a higher voltage for said moving picture recording voltage than for said still picture recording voltage.

A second image information recording/reading apparatus of the present invention is an image information recording/reading apparatus for implementing the second information recording/reading method described above, and comprises:

(a) an image detector having:
  (1) a first electrode layer,
  (2) a recording photoconductive layer that takes on electroconductivity when irradiated with recording light,
  (3) a reading photoconductive layer that takes on electroconductivity when irradiated with reading light, and
  (4) a second electrode layer, layered in this order, and having a storage section formed between said first and second electrode layers for storing electric charges produced in said recording photoconductive layer as charges representing a latent image;

(b) a voltage application means for applying a predetermined voltage between the electrodes of said first and second electrode layers;

(c) a recording light irradiation means for irradiating recording light carrying image information on said recording photoconductive layer;

(d) a reading light scanning means for scanning said reading photoconductive layer with said reading light;

(e) a signal obtaining means for obtaining an electrical signal generated by said scanning in proportion to the amount of the charges representing the latent image stored in said storage section; and (f) a control means for controlling said voltage application means, recording irradiation means, reading light scanning means, and signal obtaining means in such a manner as to implement
  a) moving picture imaging, in which a moving picture is obtained by
    1) alternately repeating irradiation of recording light carrying image information on said recording photoconductive layer, and scanning of said reading light for sequentially obtaining electrical signals in proportion to the amount of charges representing the latent images stored in said storage section, with a moving picture recording voltage being applied between the electrodes of said first and second electrode layers, and
  b) still picture imaging, in which a still picture is obtained by
    1) performing a false reading, in which still picture pre-exposure light is irradiated on said reading photoconductive layer, with said electrodes of said first and second electrode layers being maintained at the same potential,
    2) irradiating recording light carrying image information on said recording photoconductive layer, with a still picture recording voltage being applied between said electrodes of said first and second electrode layers to store the charges that represent the latent image of said image information into said storage section after said false reading is completed, and
    3) scanning said reading light for obtaining an electrical signal in proportion to the amount of said charges stored in said storage section, with said electrodes of said first and second electrode layers being maintained at the same potential,
  wherein said control means controls said voltage application means to provide a higher voltage for said moving picture recording voltage than for said still picture recording voltage.

Preferably, the first and second image information recording/reading apparatuses described above further comprise an image correction means for correcting images using different pixel correction data between the moving picture imaging and still picture imaging.

Preferably, the first and second image information recording/reading apparatuses described above further comprise an image lag correction means for correcting the influence of the image lag of the still picture for the moving picture based on the electrical signal obtained by the still picture imaging, when the still picture imaging and the moving picture imaging are alternately repeated. In this case, it is further preferable that the image lag correction means reduces the amount of correction for the image lag in proportion to the duration of the moving picture imaging.

The image information recording/reading methods and apparatuses of the present invention may obtain favorable images in both still picture imaging and moving picture imaging, when used with the short-circuited reading and positive system capable of imaging moving pictures described in Japanese Unexamined Patent Publication No. 2001-119626, the system using TFT made of a-Si described in U.S. Pat. No. 6,044,128, and the like, by applying a necessary and sufficient voltage to avoid fixed noise for still picture imaging, and applying a higher voltage than that for the still picture imaging at the time of moving picture imaging, in which the intensity of the radiation is limited because of the continuous irradiation of the radiation.

Further, if the voltage applied to the image detector is changed between the motion picture imaging and still picture imaging as in the case described above, the field intensity applied within the image detector is changed, causing a variation in the dispersion of the pixels. But the image information recording/reading methods and apparatuses of the present invention may appropriately correct the images in both the still picture imaging and moving picture imaging by using different pixel correction data between the still picture imaging and moving picture imaging.

In general, for the still picture imaging, a higher intensity recording light is irradiated than that for the moving picture imaging, so that an image lag is likely to be developed in the image detector. But the image information recording/reading methods and apparatuses of the present invention may appropriately correct the moving picture based on the electrical signal obtained by the still picture imaging, when the still picture imaging and moving picture imaging are alternately repeated. In this case, the moving picture is further appropriately corrected by reducing the amount of correction for the image lag in proportion to the duration of the moving picture imaging.

DESCRIPTION OF THE PREFERRED EMBODIMENTS

Figure 1:
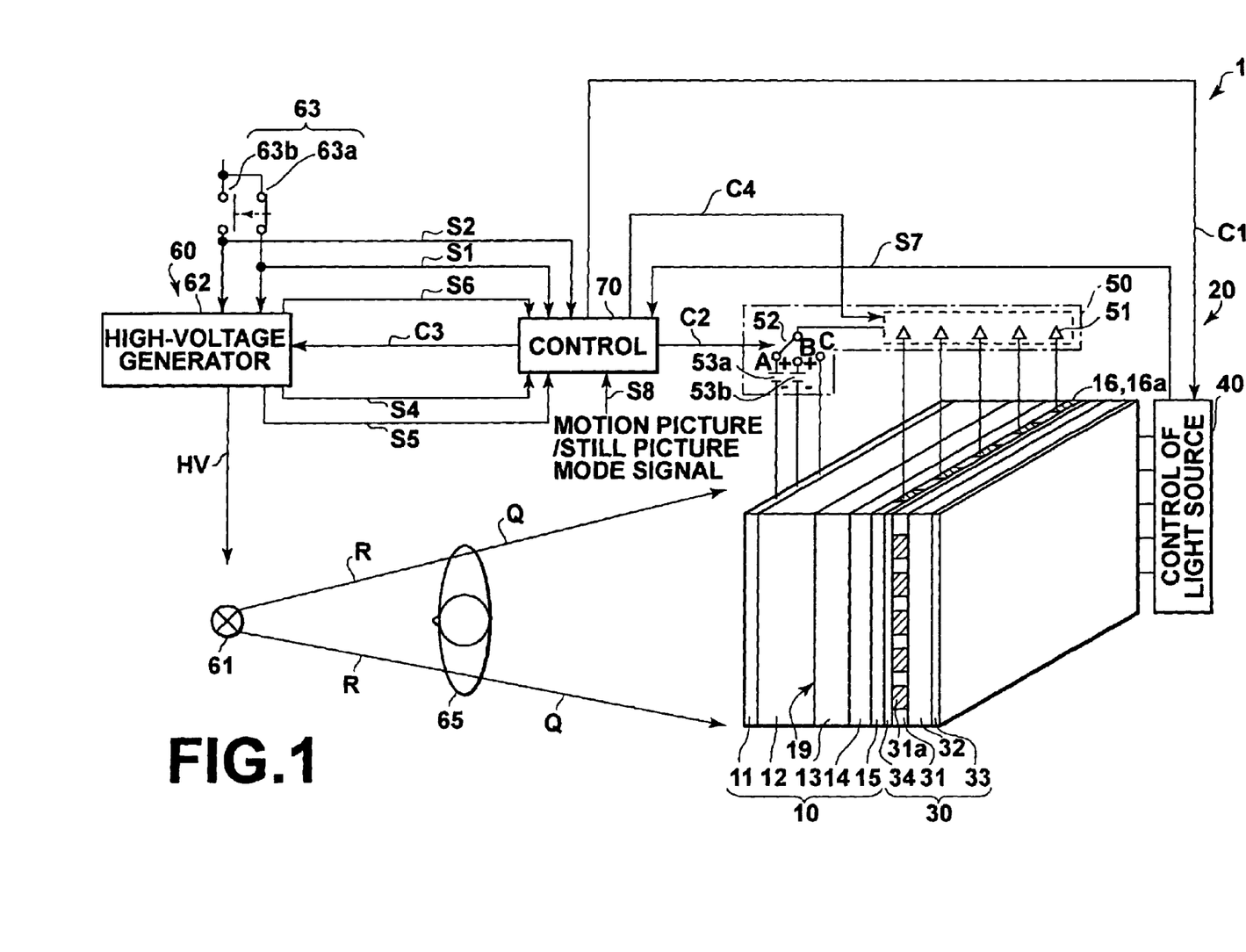
FIG. 1 is a schematic diagram of a radiation image recording/reading apparatus using an image information recording/reading method and apparatus of the present invention.

Hereinafter, preferred embodiments of the present invention will be described in detail with reference to the accompanying drawings. FIG. 1 is a schematic diagram of a radiation image recording/reading apparatus using an image information recording/reading method and apparatus of the present invention, and FIG. 2 is a schematic diagram of an electric current detection circuit used in the radiation image recording/reading apparatus shown in FIG. 1.

Figure 2:
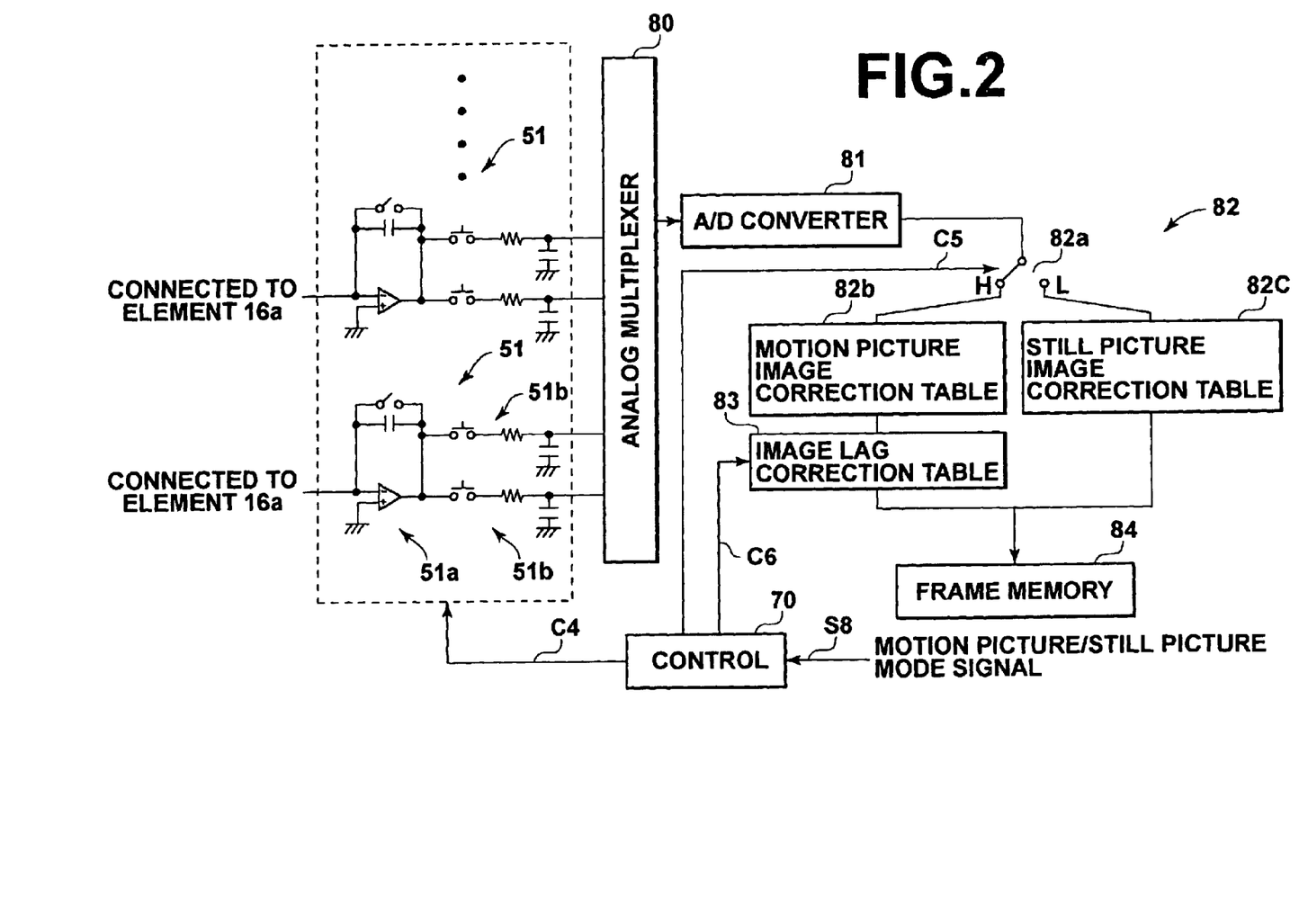
FIG. 2 is a schematic diagram of an electric current detection circuit used in the radiation image recording/reading apparatus shown in FIG. 1.

As shown in FIGS. 1 and 2, the radiation image recording/reading apparatus 1 comprises a solid-state radiation detector 10 (hereinafter referred to simply as "detector") as the image detector; a reading out section 20 comprising reading light scanning means 49 having planar light source 30 laminated on the detector 10, a light source control means 40 as the driving means for controlling the planar light source 30, and an electric current detection circuit 50 as the signal obtaining means for reading out the charges representing the latent image from the detector 10; a radiation irradiation section 60 as the recording light irradiation means; and a control means 70 for controlling the reading light scanning means 49, electric current detection means 50, and radiation irradiation section 60, etc.

The detector 10 produces electric charges in a recording photoconductive layer 12, and stores the charges as a latent image of a subject into a storage section 19, which is the interface between the recording photoconductive layer 12 and a charge transport layer 13, when a first electrode layer (electroconductive layer) 11 is irradiated with recording light (e.g., X-rays, hereinafter referred to as the "recording radiation") passed through the subject, and produces electric charges in a reading photoconductive layer 14, which are re-coupled with the charges representing the latent image of the subject to generate an electric current in proportion to the amount of the charges representing the latent image when scanned with reading light (a reading electromagnetic wave) through a second electrode layer 15. The first electrode layer (electroconductive layer) 11 is made of Au, the recording photoconductive layer 12 is made of a-Se with a thickness of 1 mm, and the reading photoconductive layer 14 is made of a-Se with a thickness of 10 $\mu$m. The second electrode layer 15 as the reading electrode layer comprises a plurality of linear electrodes (hatched portions in FIG. 1) made of ITO (Indium Tin Oxide) disposed in stripes. Hereinafter, the electrode of the second electrode layer 15 will be referred to as the striped electrode 16, and each of the linear electrodes will be referred to as the element 16a.

The planar light source 30 is an EL illuminator comprising an electroconductive layer 31, an EL layer 32, and an electroconductive layer 33, laminated on the detector 10 as described above. The EL layer 32 may be made of an organic or inorganic EL material. An insulation layer 34 is provided between the striped electrode 16 and the electroconductive layer 31 of the detector 10. The electroconductive layer 31 comprises a plurality of elements 31a (hatched portions in FIG. 1) disposed in stripes, each of the elements 31a is extended in a direction transverse (substantially orthogonal in this example) to each element 16a of the striped electrode 16 of the detector, which comprises a plurality of linear light sources made of elements 31a arranged in a flat plane. Each of the elements 31a is connected to the light source control means 40.

The light source control means 40 is a means for applying a predetermined voltage between the elements 31a and the opposite electroconductive layer 33, which applies a voltage to each of the elements 31a separately at the time of reading, and to more than one or all of the elements 31a simultaneously at the time of irradiation of pre-exposure light. For example, when a DC voltage is applied between each of the elements 31a and the electroconductive layer 33 with the elements 31a being switched sequentially, EL light is emitted from the EL layer 32 disposed therebetween, and the EL light passed through the elements 31a may be used as linear reading light (hereinafter referred to as the "linear light") More specifically, the planar light source 30 is equivalent to a light source comprising a plurality of small linear light sources disposed in a flat plane. If the elements 31a are switched sequentially in the longitudinal direction of the striped electrode 16 from one end through to the other to emit EL light, then the entire surface of the striped electrode 16 is to be scanned electrically with linear light. The longitudinal direction of the elements 16a corresponds to the sub-scanning direction, and the direction in which the linear light is extended corresponds to the main scanning direction.

On the other hand, when a voltage is applied to more than one or all of the elements 31a, EL light is emitted from the EL layer 32, and irradiated substantially uniformly over the entire surface of the striped electrode 16, which is used as the pre-exposure light.

That is, the planar light source 30 is constructed and adapted to function as the light source for emitting pre-exposure light, as well as reading light.

The light source control means 40 receives a control signal C1; and if the control signal C1 is in the state of "low" (L), the control means 40 assumes a pre-exposure light mode, in which the EL light is emitted as pre-exposure light for still and moving pictures, and if it is in the state of "high" (H), the control means assumes a reading light mode, in which the EL light is emitted as the reading light. When the control signal C1 is in the sate of high impedance, no EL light is emitted from the planar light source 30.

The electric current detection circuit 50 has a plurality of electric current detection amplifiers 51, each connected to an inverting input terminal of each of the elements 16a of the striped electrode 16. Each of the electric current detection amplifiers 51 comprises a charge amplifier 51a, and a two-channel sample-and-hold circuit 51b, which is constructed and adapted to perform correlated double sampling.

The first electrode layer 11 is connected to one of the inputs of a switch 52, the negative pole of a power supply 53a, and the negative pole of a power supply 53b. The positive pole of the moving picture recording power supply 53a is connected to another input of the switch 52, and the positive pole of the still picture recording power supply 53b is connected to still another input of the switch 52. The switch 52 and power supply 53 comprises the voltage application means of the present invention. In this embodiment, 30 kV and 10 kV power supplies are used for the moving picture recording power supply 53a, and still picture recording power supply 53b respectively.

The output of the switch 52 is commonly connected to respective non-inverting input terminals of the charge amplifiers 51a, each comprising each of the electric current detection amplifiers 51. When linear light as the reading light is illuminated from the planar light source 30 onto the striped electrode 16 (scanned with exposure light), respective electric current detection amplifiers detect respective electric currents flowing through the respective elements 16a connected to the respective amplifiers simultaneously (in parallel).

Any known structure may be applied to the electric current detection amplifier 51, in addition to that described above. It is obvious that connections between the switch 52, power supply 53, and each of the elements 16a may vary depending on the structure of the current detection amplifier 51.

The output of each of the electric current detection amplifiers 51 is connected to an analog multiplexer 80, and the output of the multiplexer 80 is inputted to an A/D converter 81 to be converted into a digital signal, which is inputted to an image correction means 82.

The image correction means 82 comprises a switch 82a, moving picture image correction means 82b, and still picture image correction means 82c. The output of the analog multiplexer 80 is connected to the input of the switch 82a. One of the outputs of the switch 82a is connected to a moving picture image correction table, and another output of the switch 82a is connected to a still picture image correction table. The output of the moving picture image correction means 82b is connected to an image lag correction means 83. The output of moving picture image correction means 82b by way of the image lag correction means 83, and the output of the still picture image correction means 82c are inputted to a frame memory 84 to be composed as an image.

The radiation irradiation section 60 comprises a radiation source 61 for irradiating radiation R; a high-voltage generator 62 for generating driving power of the radiation source 61; and a switch 63 for controlling imaging, which is connected to the high-voltage generator 62. The switch 63 is a two-stage switch comprising switches 63a and 63b, and constructed such that the switch 63b is not switched on unless the switch 63a is switched on.

The control means 70 is constructed and adapted to receive a signal S8 for setting moving picture/still picture mode. Preferably, the control means 70 is constructed and adapted to receive signals S1 and S2 from the respective switches 63a and 63b; a standby signal S4, an irradiation completion signal S5 that indicates the completion of the irradiation of the recording radiation, and a signal S6 that indicates irradiation time setting for the recording radiation from the high-voltage generator 62; and an irradiation completion signal S7, which indicates the completion of the irradiation of the pre-exposure light from the light source control means 40, and outputs signals C1, C2, C3, C4, C5, and C6 to the light source control means 40, switch 52, high-voltage generator 62, electric current detection circuit 50, image correction means 82, and image lag correction means respectively, in order for the various operational functions to be implemented automatically at predetermined timings, which will be described later.

The switch 52 switches to the moving picture recording power supply 53a to cause the moving picture recording voltage to be applied from the moving picture recording power supply 53a to the detector 10 (more specifically, between the electrode of the first electrode layer 11 and the striped electrode 16), when the control signal C2 is in Pattern A, and switches to the still picture recording power supply 53b to cause the still picture recording voltage to be applied from the still picture recording power supply 53b to the detector 10, when the control signal C2 is in Pattern B. If the control signal C2 is in Pattern C, the switch 52 is switched to the first electrode layer 11, and the electrode of the first electrode layer 11, and the striped electrode 16 are substantially short-circuited through the imaginary short-circuits of the charge amplifiers comprising electric current detection amplifiers 51 to be maintained at the same potential. Further, when the control signal C2 is in the state of high impedance, the application of the voltages to the detector 10, and short-circuiting of the electrodes are not implemented by switching the switch 52 to a neutral point, floating the positive poles of the moving picture recording power supply 53a and still picture recording power supply 53b.

The high-voltage generator 62 supplies a high-voltage HV to the radiation source 61 to generate radiation R from the radiation source 61 when "H" is inputted as the control signal C3.

The switch 82a of the image correction means switches to moving picture image correction means 82b when "H" is inputted as the control signal C5, and switches to the still picture image correction means 82c when "L" is inputted as the control signal C5.

The image lag correction means 83 performs image lag correction process for the moving picture signal inputted thereto when "H" is inputted as the control signal C6, and passes through the moving picture signal without implementing image lag correction process when "L" is inputted as the control signal C6.

Figure 4:
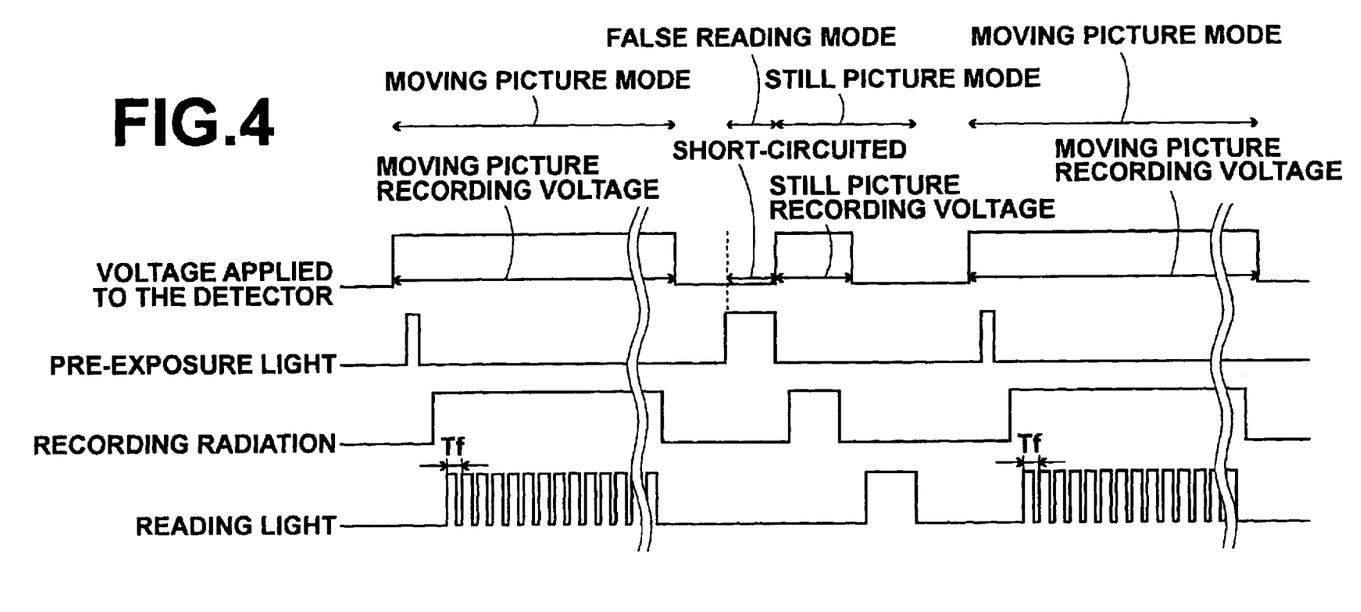
FIG. 4 is a timing chart illustrating a first mode of operation of the radiation image recording/reading apparatus shown in FIG. 1

Hereinafter, the operation of the radiation image recording/reading apparatus 1 configured in the aforementioned manner will be described with reference to the timing chart shown in FIG. 4. In the timing chart shown in FIG. 4, the High-level period indicates an active period during which the voltage is applied to the detector 10, and the irradiation of light (pre-exposure light, recording radiation, and reading light) are implemented; and the low-level period (reference level period) is an inactive period which is opposite from the active period.

The radiation image recording/reading apparatus 1 according to this embodiment is a radiation image recording/reading apparatus that repeatedly scans the reading photoconductive layer 14 with the linear light, with the recording radiation Q being continuously irradiated on the recording photoconductive layer 12 (moving picture mode), implements the false reading (false reading mode), then records an electrostatic latent image (still picture mode); and thereafter this process is repeated, i.e., moving picture mode, false reading mode, and then still picture mode.

When the signal S8 indicating the moving picture mode is inputted to the control means 70, the control means 70 first turns the control signal C2 into Pattern A in order to cause the switch 52 to switch to the moving picture recording power supply 53a to apply a DC voltage of 30 kV as the moving picture recording voltage between the electrode of the first electrode layer 11 and striped electrode 16 from the moving picture recording power supply 53a for charging the electrodes 11 and 16, so that the charges produced in the reading photoconductive layer 14 of the detector 10 may be stored in the storage section 19, in the moving picture pre-exposure initiation control that controls the start of the irradiation of the moving picture pre-exposure light.

Then, the control means 70 turns the control signal C1 to be inputted to the light source control means 40 into "L" (moving picture pre-exposure mode) to cause the planar light source 30 to emit EL light as the moving picture pre-exposure light, and irradiate the moving picture pre-exposure light on the entire surface of the reading photoconductive layer 14. Then, positive/negative charge pairs are produced in the reading photoconductive layer 14 in proportion to the amount of the pre-exposure light due to a photoconductive effect of the pre-exposure light. The positive charges of the pairs are stored along a predetermined field distribution into the storage section 19, which is the interface between the recording photoconductive layer 12 and charge transport layer 13, and the negative charges produced in the recording photoconductive layer 14 are re-coupled with the positive charges injected into the striped electrode 16 from the moving picture recording power supply 53a, and disappear. The positive charges stored into the storage section 19 at this time are the charges having the reverse polarity to that of the charges stored into the storage section 19 at the time of the still picture mode which will be described later. The amount of charges stored into the storage section 19 is proportional to the amount of the moving picture pre-exposure light irradiated on the photoconductive layer 14. Here, the charges are stored in the storage section 19 in substantially uniformly, since the EL light is irradiated substantially uniformly across the entire surface of the reading photoconductive layer 14. So far, the primary charging of the detector 10 has been completed.

The order of starting application of the moving picture recording voltage and starting irradiation of the moving picture pre-exposure light is not limited to the example described above, and may be reversed as long as they are implemented in sequence.

Then, the control means 70 turns the control signal C1 to be inputted to the light source control means 40 into the state of high impedance to terminate the emission of the EL light from the planar light source 30 to terminate the primary charging described above.

After terminating the irradiation of the moving picture pre-exposure light in this way, the control means 70 causes the high-voltage generator 62 to supply the high voltage HV to the radiation source 61 for irradiating the radiation R from the radiation source 61, with the moving picture recording voltage being applied between the electrode of the first electrode layer 11 and striped electrode 16. The radiation R is irradiated onto a subject 65, and the recording radiation Q that has passed through the subject 65, and carries the radiation image information of the subject 65 is irradiated on the recording photoconductive layer 12 of the detector 10. The amount of radiation per image (frame) is reduced so that the total amount of radiation in the moving picture mode does not exceed the permissible radiation dosage.

Through the irradiation of the recording radiation Q, positive/negative charge pairs are produced in the recording photoconductive layer 12 in proportion to the radiation dosage due to photoconductive effect by the recording radiation Q. The negative charges of the pairs are concentrated and moved to the storage section 19, which is the interface between the recording photoconductive layer 12 and charge transport layer 13, along predetermined field distributions developed by each of the elements 16a of the striped electrode 16. The predetermined amount of positive charges has been stored in the storage section 19 through the primary charging described above, so that the negative charges moved thereto are re-coupled with the positive charges, and disappear (are discharged). Meanwhile, the positive charges produced in the recording photoconductive layer 12 are attracted to the first electrode layer 11, re-coupled with the negative charges injected from the moving picture recording power supply 53a, and disappear.

In the moving picture mode, when reading out the electrostatic image, the control signal C1 is turned into "H" (reading light mode) to cause the light source control means 40 to sequentially apply a predetermined DC voltage between each of the elements 31a and the electroconductive layer 33 by sequentially switching the elements 31a for electrically scanning the entire surface of the reading photoconductive layer 14 with the linear light emitted from the EL layer 32.

By the scanning with the linear light, positive/negative charge pairs are produced on the portion of the photoconductive layer 14 corresponding to a sub-scanning position of the photoconductive layer 14 to which the linear light is irradiated. The positive charges of the pairs move to the storage section 19, through the charge transport layer 13, to replenish the positive charges that have disappeared due to the recording radiation Q.

On the other hand, the negative charges produced in the photoconductive layer 14 are re-coupled with the positive charges injected into the striped electrode 16 from the moving picture recording power supply 53a, and disappear.

The recording radiation Q has continuously been irradiated on the recording photoconductive layer 12, and in the area where the irradiation of the linear light is completed, the positive charges charged by the irradiation of the linear light are resolved (discharged) again in proportion to the radiation dosage of the radiation Q, and the amount of charges discharged is replenished by the same amount by the next scanning of the linear light. That is, the total amount of the charges discharged is equal to the sum of the charges charged by the next scanning, and this cycle is repeated. Each of the elements 16a has the electric current detection amplifier 51 connected thereto, which converts the amount of charges charged by each scanning of the linear light into a voltage signal for detection.

Here, the amount of positive charges that disappear at the storage section 19 is substantially proportional to the amount of radiation irradiated, and the scanning of the linear light replenishes the amount of positive charges disappeared, so that the amount of positive charges that disappear by the irradiation of the recording radiation Q carries an image in the moving picture mode, and the moving picture may be reproduced by repeating this cycle.

Further, in order to improve the image quality in reproducing the moving picture, the control signal C5 to be inputted to the switch 82a of the image correction means is turned into "H" to input the moving picture signal to the moving picture image correction means 82b for the correction of the moving picture signal with the moving picture image correction table.

Although the image lag correction is implemented for the moving picture signal after the image correction, the moving picture signal is passed directly through the image lag correction means 83 by turning the control signal C6 to be inputted thereto into "L" in the initial moving picture mode, since no image lag, which is developed by the imaging in the still picture mode, is found in the initial moving picture mode. For the second moving picture mode and thereafter, the control signal C6 to be inputted to the image lag correction means 83 is turned into "H" to implement the image lag correction based on the still picture signal obtained in the immediately preceding still picture mode. The image lag described above is gradually reduced by heat excitation in proportion to the duration of the moving picture imaging, so that an appropriate image lag correction may be made by reducing the amount of correction in proportion to the duration of the moving picture imaging.

The moving picture signal processed by the image correction means 82, and image lag correction means 83 is inputted to the frame memory 84 to be composed as a moving picture.

The process in the moving picture mode is identical to that of a TV image pickup tube, in which an optical image formed on the photoelectric surface is stored as the latent image, which is then read out by the scanning of an electron beam, and the period for the linear light to scan the same scanning position twice corresponds to the period Tf for a single frame.

As is clear from the aforementioned description, the purpose of the irradiation of the moving picture pre-exposure light prior to the irradiation of the recording radiation Q is to secure appropriate and reliable reproduction of the first image (first frame), so if the irradiation of moving picture pre-exposure light is not required, it may be omitted.

After the moving picture mode is completed, the false reading, and the recording of the electrostatic latent image will be implemented in sequence. More specifically, the following steps will be taken.

When implementing pre-exposure initiation control that controls the start of the irradiation of the false reading pre-exposure light, the control means 70 first turns the control signal C2 to be inputted to the switch 52 into Pattern C. Thereby, the switch 52 is caused to switch to the first electrode layer to substantially short-circuit the electrode of the first electrode layer 11 and striped electrode 16, to maintain the electrode of the first electrode layer 11 and the striped electrode 16 at the same potential. Then the control means 70 turns the control signal C1 to be inputted to the light source control means into "L" (pre-exposure mode) to cause the planar light source 30 to emit EL light as the pre-exposure light, and implement the false reading in which the pre-exposure light is irradiated on the reading photoconductive layer 14.

Then, the control means 70 turns the control signal Cl to be inputted to the light source control means 40 into the state of high impedance to terminate the emission of the EL light from the planar light source 30 to terminate the false reading.

After terminating the false reading in this way, an electrostatic latent image is recorded in the detector 10 by irradiating the recording radiation Q on the first electrode layer 11, with the still image recording voltage being applied between the electrode of the first electrode layer 11 and the striped electrode 16. More specifically, the control means 70 first turns the control signal C2 to be inputted to the switch 52 into Pattern B to cause the switch 52 to switch to the still picture recording power supply 53b to apply a DC voltage of 10 kV as the still picture recording voltage between the electrode of the first electrode layer 11 and the striped electrode 16 from the still picture recording power supply 53b to charge the electrodes 11 and 16, so that the charges produced in the recording photoconductive layer 12 of the detector may be stored in the storage section 19.

Here, the reason for the use of a lower voltage for the still picture recording than that for the moving picture recording is that a lower voltage causes less image deformation due to charge injections to the detector, etc. In addition, for the still picture, higher intensity recording radiation may be used than that for the moving picture, so that even if a lower voltage is used for the still image recording, a still picture of comparative or better quality than a moving picture may be obtained.

The timing for applying the still image recording voltage is not limited to the moment after the irradiation of pre-exposure light on the photoconductive layer is completely ceased, and the application of the voltage may overlap slightly with the irradiation of the pre-exposure light.

After the still image recording voltage is applied, the control means 70 causes the high-voltage generator 62 to supply the high voltage HV to the radiation source 61 to irradiate the radiation R from the radiation source 61. The radiation R is irradiated onto a subject 65, and the recording radiation Q that has passed through the subject 65, and carries the radiation image information of the subject 65 is irradiated on the recording photoconductive layer for a predetermined time period. Then, positive/negative charge pairs are produced in the photoconductive layer 12, and the negative charges of the pairs are concentrated to each of the elements 16a of the striped electrode 16 along the predetermined field distributions, and stored into the storage section 19, which is the interface between the recording photoconductive layer 12 and charge transport layer 13, as the charges representing the latent image. The amount of the charges representing the latent image is substantially proportional to the amount of radiation irradiated, so that the charges representing the latent image may represent the electrostatic latent image (still picture) of the radiation image information. In the mean time, the positive charges produced in the recording photoconductive layer 12 are attracted to the first electrode layer 11, re-coupled with the negative charges injected from the still picture recording power supply 53b, and disappear.

In reading out the electrostatic latent image from the detector 10, the control signal C1 is turned into "H" (reading light mode) to cause the switch 52 to switch to the electrode of the first electrode layer 11 of the detector 10, which causes the light source control means 40 to sequentially apply a predetermined DC voltage between each of the elements 31a and the electroconductive layer 33 by sequentially switching the elements 31a to electrically scan the entire surface of the photoconductive layer 14 with the linear light emitted from the EL layer 32.

By the scanning with the linear light, positive/negative charge pairs are produced on the portion of the photoconductive layer 14 corresponding to a sub-scanning position of the photoconductive layer 14 to which the linear light is irradiated. The positive charges of the pairs are attracted by the negative charges (charges representing the latent image) stored in the storage section 19, and move quickly through the charge transport layer 13. Then, the positive charges are re-coupled with the charges representing the latent image in the storage section 19, and disappear. Meanwhile, the negative charges produced in the reading photoconductive layer 14 are re-coupled with the positive charges injected from the still picture recording power supply 53b to the striped electrode 16, and disappear. In this way, the negative charges stored in the storage section 19 of the detector 10 are dissolved by the charge re-coupling, and electric currents are generated in the detector 10 by the movement of the charges in the charge re-coupling. These electric currents generated in the detector are detected simultaneously by each of the electric current detection amplifiers 51 connected to each of the elements 16a. The amount of current flowing through the detector 10 at the time of reading is proportional to the charges representing the latent image or the electrostatic latent image, so that the electrostatic latent image may be read out by detecting the electric current, i.e., the image signal representing the electrostatic latent image (still picture) may be obtained.

Further, in order to improve the image quality in reproducing the still picture, the control signal C5 to be inputted to the switch 82a of the image correction means is turned into "L" to input the still picture signal to the still picture image correction means 82c to correct the still picture signal using the still picture image correction table. The still picture signal processed by the image correction means 82 is inputted to the frame memory 84 to be composed as a still picture.

When the still picture mode is completed, the radiation image recording/reading apparatus 1 returns to the moving picture mode, and thereafter the cycle of the moving picture mode, false reading mode, and still picture mode is repeated.

The apparatus 1 using the image information recording/reading method of the present invention may obtain favorable images in the imaging of both still and moving pictures by applying a necessary and sufficient voltage to avoid fixed noise at the time of still picture imaging, and applying a higher voltage than that for the still picture imaging at the time of moving picture imaging, in which the radiation needs to be irradiated continuously as described above.

Unlike the timing scheme shown in FIGS. 5 and 6, which will be described later, the timing scheme employed in the apparatus according to the first embodiment of the present invention described above does not require that the irradiation timing of the reading light is synchronized with that of the recording radiation and pre-exposure light, so that it has an advantage that it requires only a simple control mechanism. On the other hand, the recording radiation images are accumulated during the time in which a single frame is scanned (e.g., around 100 ms), and the moving picture obtained becomes blurred (blunt) due to time difference in the accumulated images.

Hereinafter, a second embodiment of the radiation image recording/reading apparatus using the image information recording/reading method and apparatus of the present invention will be described. The second embodiment of the present invention differs from the first embodiment described above, in that the second embodiment employs a different timing scheme. FIGS. 5 and 6 are the timing charts illustrating the timings of operation of the apparatus according to the second embodiment.

The apparatus according to the first embodiment of the present invention described above employs the timing scheme in which the photoconductive layer 14 is repeatedly scanned with the linear light, with the recording radiation Q being continuously irradiated on the recording photoconductive layer 12 when the apparatus is in the moving picture mode, whereas the apparatus according to the second embodiment employs the timing scheme in which the photoconductive layer 14 is repeatedly scanned with the linear light in synchronization with the recording radiation, with the recording radiation Q being irradiated on the recording photoconductive layer 12 as a pulse.

Figure 5:
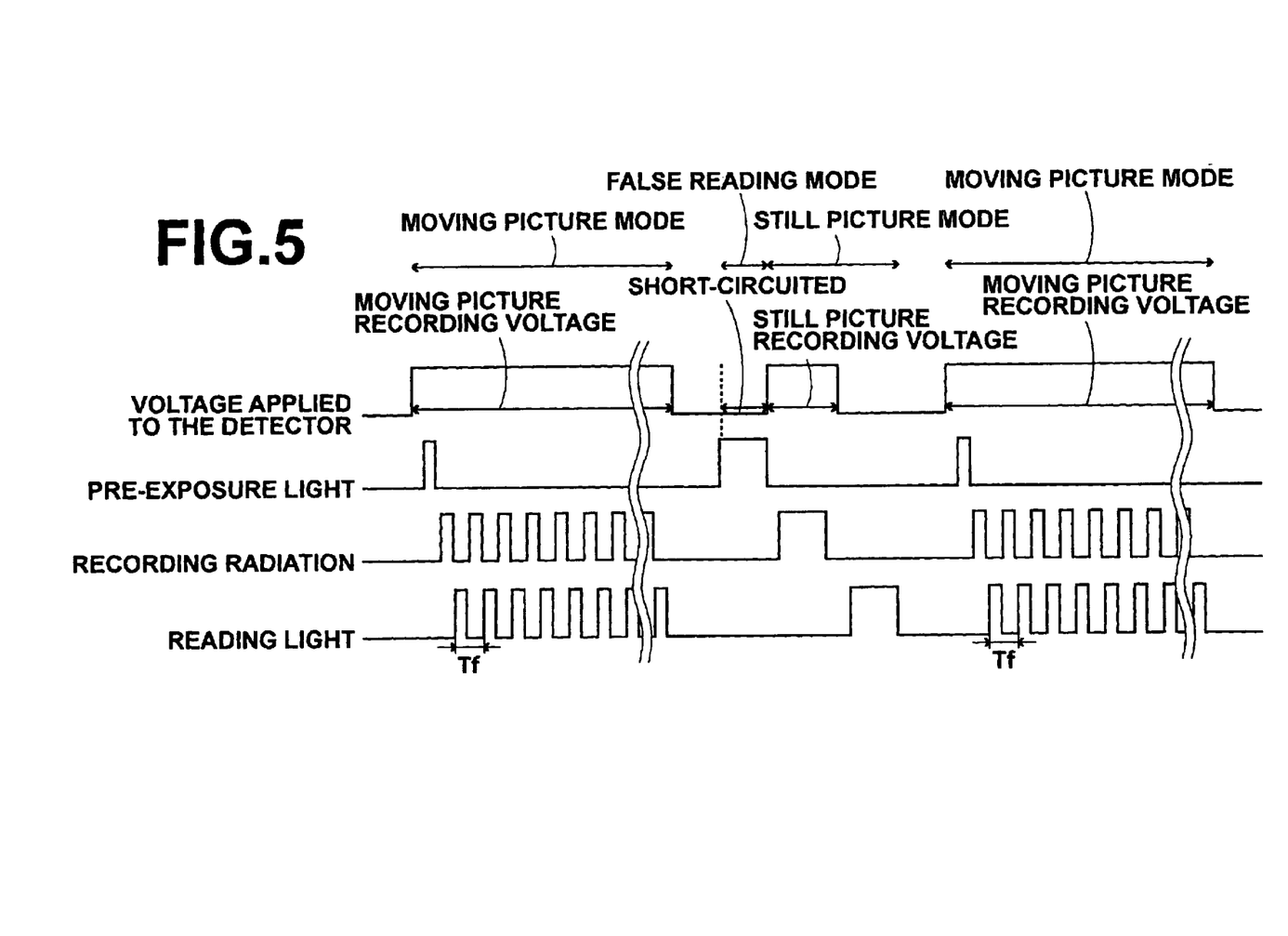
FIG. 5 is a timing chart illustrating a second mode of operation of the radiation image recording/reading apparatus shown in FIG. 1.

More specifically, as illustrated in FIG. 5, after the irradiation of the recording radiation Q on the recording photoconductive layer 12 is terminated, the scanning with the linear light for a single frame is implemented, and when it is completed, the irradiation of the recording radiation Q on the recording photoconductive layer is initiated, and thereafter this process is repeated.

The apparatus according to the first embodiment employs the timing scheme in which the positive charges charged by the irradiation of the linear light are dissolved (discharged) immediately in proportion to the amount of radiation of the recording radiation Q at the portion of the photoconductive layer 14 where the irradiation of the linear light through the electrical scanning is completed, whereas the apparatus according to the second embodiment employs the timing scheme in which the positive charges are re-discharged after the scanning with the linear light for a single frame is completed.

Figure 6:
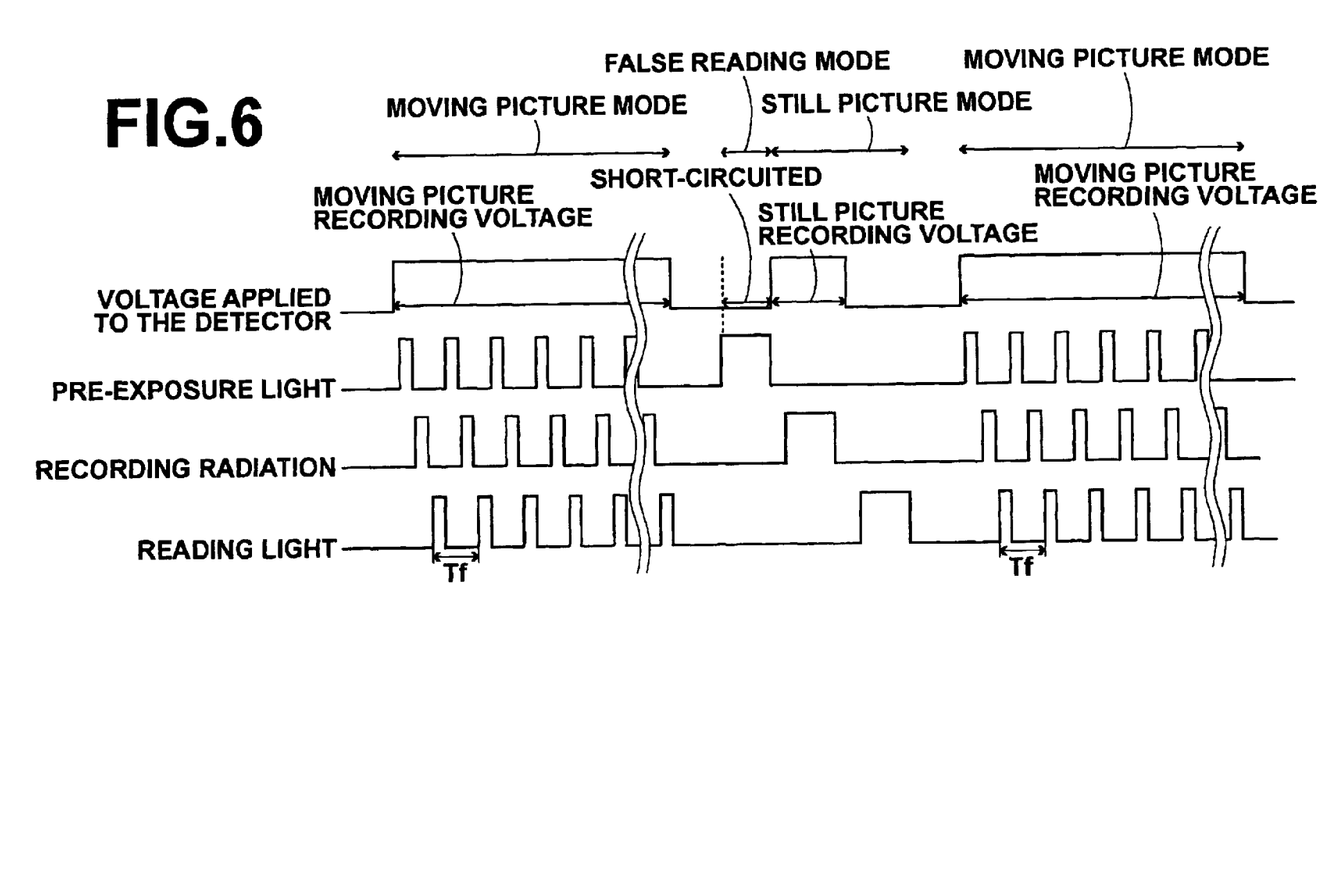
FIG. 6 is a timing chart illustrating a modification of the second mode of operation.

In this case, as shown in FIG. 6, the irradiation of the pre-exposure light prior to the irradiation of the recording radiation Q may be repeated with each cycle, instead of alternately repeating the irradiation of the recording radiation Q and the scanning of the linear light.

In the timing scheme employed in the apparatus according to the second embodiment, the irradiation of the reading light and recording radiation need to be implemented in synchronization with each other, or the irradiation of the reading light, recording radiation, and pre-exposure light need to be implemented in a synchronized manner, but the image information stored by a pulse in the pulse train of the recording radiation is read out immediately after it is irradiated, so that the apparatus according to the second embodiment may obtain a clear and sharp image of the moving picture. Further, if the pre-exposure light is also implemented in a synchronized manner, as illustrated in FIG. 6, the detector is assured to be initialized in each cycle, and a moving picture of higher quality than in the case shown in FIG. 5 may be obtained.

The preferred embodiments of the radiation image recording/reading apparatus using the image information recording/reading apparatus of the present invention have been described, but the present invention is not limited to these embodiments described above.

For example, the description has been made that the planar light source 30 formed by the electrical scanning is made of an EL illuminator, but it is not limited to this. The light source 30 may be formed, for example, with dotted or linear microscopic LEDs arranged in a two-dimensional plane.

Further, the light source for the pre-exposure light for the primary charging or false reading, and for the reading light is not necessary be limited to the planar light source 30 formed by the electrical scanning described above. It may be, for example, a light source that scans an image detector with a light beam in two-dimensional direction (mechanical scanning). In this case, the two-dimensional scanning may be substantially implemented by using a one-dimensional light beam with the image detector being moved relative to the light source.

Further, in the preferred embodiments described above, the description has been made that the radiation direction of the recording light is opposite to that of the pre-exposure and reading lights, but these lights may be in the same direction. In this case, the recording photoconductive layer used is sensitive only to the recording light, and the reading photoconductive layer used is sensitive only to the pre-exposure and reading lights.

Further, the recording light may be any light or the like, as long as it is capable of sensitizing the recording photoconductive layer, and visible light, infrared light, ultraviolet light, and other electromagnetic waves may be used, in addition to radiation. Likewise, the reading light may be any light or the like, as long as it is capable of sensitizing the reading photoconductive layer, and visible light, infrared light, ultraviolet light, and other electromagnetic waves may be used.

Still further, for example, a phosphor sheet that emits fluorescence when irradiated with radiation as the recording light may be attached to the first electrode layer. In this case, the recording photoconductive layer may be made of any material as long as it is sensitive to the fluorescence, and may not be sensitive to radiation.

It is evident that the first and second electrode layers need to have transparency to the recording light, pre-exposure light, or reading light, depending on the embodiment employed.

Further, in the preferred embodiments described above, the description has been made that the primary charging prior to the irradiation of the recording light (recording radiation) is implemented by irradiating the pre-exposure light on the reading photoconductive layer, but it is not limited to this. It may be implemented by irradiating the recording light as the light for primary charging on the recording photoconductive layer, with the polarity of the applied voltage being reversed.

The present invention may also use other types of image detectors in addition to that described in the preferred embodiments. For example, an optical reading and positive type image detector comprising a first electrode layer; a recording photoconductive layer; a reading photoconductive layer; and a second electrode layer, layered in this order, and having a storage section formed between the first and second electrode layers with additional layers (trap layer, insulation layer, etc.), or a laminated microscopic electroconductive member (microplate) described in U.S. Pat. Nos. 4,535,468, and 6,268,614, the radiation detector having an a-Se photoconductive layer formed on an a-Se TFT described in U.S. Pat. No. 6,044,128, and the like may also be used.

What is claimed is:

1. An image information recording/reading method for use with an image detector that converts recording light into electric charges that represent a latent image for storage, said method comprising the steps of:

(a) implementing moving picture imaging for obtaining a moving picture by (1) alternately repeating irradiation of recording light carrying image information on said image detector, and reading of the charges representing the latent image for sequentially obtaining electrical signals in proportion to the amount of said charges, with a moving picture recording voltage being applied to said image detector; and (b) implementing still picture imaging for obtaining a still picture by (1) irradiating recording light carrying image information to store the charges that represent the latent image of said image information, with a still picture recording voltage being applied to said image detector, and (2) reading out said charges for obtaining an electrical signal in proportion to the amount of said charges, wherein said moving picture recording voltage is set higher than said still picture recording voltage.

2. An image information recording/reading method for use with an image detector comprising:

a first electrode layer;

a recording photoconductive layer that takes on electroconductivity when irradiated with recording light;

a reading photoconductive layer that takes on electroconductivity when irradiated with reading light; and a second electrode layer, layered in this order, and having a storage section formed between said first and second electrode layers for storing electric charges produced in said recording photoconductive layer as charges representing a latent image, said method comprising the steps of:

(a) implementing moving picture imaging for obtaining a moving picture by (1) alternately repeating irradiation of recording light carrying image information on said recording photoconductive layer, and scanning of said reading light for sequentially obtaining electrical signals in proportion to the amount of charges representing the latent images stored in said storage section, with a moving picture recording voltage being applied between the electrodes of said first and second electrode layers, and (b) implementing still picture imaging for obtaining a still picture by (1) performing a false reading, in which still picture pre-exposure light is irradiated on said reading photoconductive layer, with said electrodes of said first and second electrode layers being maintained at the same potential, (2) irradiating recording light carrying image information on said recording photoconductive layer, with a still picture recording voltage being applied between said electrodes of said first and second electrode layers to store the charges that represent the latent image of said image information into said storage section after said false reading is completed, and (3) scanning said reading light for obtaining an electrical signal in proportion to the amount of said charges stored in said storage section, with said electrodes of said first and second electrode layers being maintained at the same potential, wherein said moving picture recording voltage is set higher that said still picture recording voltage.

3. An image information recording/reading method according to claim 1, wherein image correction is implemented using different pixel correction data between said moving picture imaging and said still picture imaging.

4. An image information recording/reading method according to claim 2, wherein image correction is implemented using different pixel correction data between said moving picture imaging and said still picture imaging.

5. An image information recording/reading method according to claim 1, wherein the influence of image lag of said still picture is corrected for said moving picture based on said electrical signal obtained by said still picture imaging, when said moving picture imaging and said still picture imaging are alternately repeated.

6. An image information recording/reading method according to claim 2, wherein the influence of image lag of said still picture is corrected for said moving picture based on said electrical signal obtained by said still picture imaging, when said moving picture imaging and said still picture imaging are alternately repeated.

7. An image information recording/reading method according to claim 5, wherein the amount of correction for said image lag is reduced in proportion to the duration of said moving picture imaging.

8. An image information recording/reading method according to claim 6, wherein the amount of correction for said image lag is reduced in proportion to the duration of said moving picture imaging.

9. An image information recording/reading apparatus comprising:

(a) an image detector for converting recording light into electric charges that represent a latent image for storage;

(b) a voltage application means for applying a predetermined voltage to said image detector;

(c) a recording light irradiation means for irradiating recording light carrying image information on said detector;

(d) a signal obtaining means for obtaining an electrical signal in proportion to the amount of the charges representing the latent image from said detector; and (e) a control means for controlling said voltage application means, recording light irradiation means, and signal obtaining means in such a manner as to implement a) moving picture imaging, in which a moving picture is obtained by 1) alternately repeating irradiation of recording light carrying image information on said image detector, and reading of the charges representing the latent image for sequentially obtaining electrical signals in proportion to the amount of said charges, with a moving picture recording voltage being applied to said image detector; and b) still picture imaging, in which a still picture is obtained by 1) irradiating recording light carrying image information to store the charges that represent the latent image of said image information, with a still picture recording voltage being applied to said image detector, and 2) reading out said charges for obtaining an electrical signal in proportion to the amount of said charges, wherein said control means controls said voltage application means to provide a higher voltage for said moving picture recording voltage than for said still picture recording voltage.

10. An image information recording/reading apparatus comprising:

(a) an image detector having:

(1) a first electrode layer, (2) a recording photoconductive layer that takes on electroconductivity when irradiated with recording light, (3) a reading photoconductive layer that takes on electroconductivity when irradiated with reading light, and (4) a second electrode layer, layered in this order, and having a storage section formed between said first and second electrode layers for storing electric charges produced in said recording photoconductive layer as charges representing a latent image;

(b) a voltage application means for applying a predetermined voltage between the electrodes of said first and second electrode layers;

(c) a recording light irradiation means for irradiating recording light carrying image information on said recording photoconductive layer;

(d) a reading light scanning means for scanning said reading photoconductive layer with said reading light;

(e) a signal obtaining means for obtaining an electrical signal generated by said scanning in proportion to the amount of the charges representing the latent image stored in said storage section; and (f) a control means for controlling said voltage application means, recording irradiation means, reading light scanning means, and signal obtaining means in such a manner as to implement a) moving picture imaging, in which a moving picture is obtained by 1) alternately repeating irradiation of recording light carrying image information on said recording photoconductive layer, and scanning of said reading light for sequentially obtaining electrical signals in proportion to the amount of charges representing the latent images stored in said storage section, with a moving picture recording voltage being applied between the electrodes of said first and second electrode layers, and b) still picture imaging, in which a still picture is obtained by 1) performing a false reading, in which still picture pre-exposure light is irradiated on said reading photoconductive layer, with said electrodes of said first and second electrode layers being maintained at the same potential,
2) irradiating recording light carrying image information on said recording photoconductive layer, with a still picture recording voltage being applied between said electrodes of said first and second electrode layers to store the charges that represent the latent image of said image information into said storage section after said false reading is completed, and
3) scanning said reading light for obtaining an electrical signal in proportion to the amount of said charges stored in said storage section, with said electrodes of said first and second electrode layers being maintained at the same potential, wherein said control means controls said voltage application means to provide a higher voltage for said moving picture recording voltage than for said still picture recording voltage.

11. An image information recording/reading apparatus according to claim 9, wherein said apparatus further comprises an image correction means for correcting images using different pixel correction data between said moving picture imaging and said still picture imaging.

12. An image information recording/reading apparatus according to claim 10, wherein said apparatus further comprises an image correction means for correcting images using different pixel correction data between said moving picture imaging and said still picture imaging.

13. An image information recording/reading apparatus according to claim 9, wherein said apparatus further comprises an image lag correction means for correcting the influence of image lag of said still picture for said moving picture based on said electrical signal obtained by said still picture imaging, when said still picture imaging and said moving picture imaging are alternately repeated.

14. An image information recording/reading apparatus according to claim 10, wherein said apparatus further comprises an image lag correction means for correcting the influence of image lag of said still picture for said moving picture based on the electrical signal obtained by said still picture imaging, when said still picture imaging and said moving picture imaging are alternately repeated.

15. An image information recording/reading apparatus according to claim 13, wherein said image lag correction means reduces the amount of correction for said image lag in proportion to the duration of said moving picture imaging.

16. An image information recording/reading apparatus according to claim 14, wherein said image lag correction means reduces the amount of correction for said image lag in proportion to the duration of said moving picture imaging.

* * * * *